US011889608B1

(12) United States Patent
Lin et al.

(10) Patent No.: US 11,889,608 B1
(45) Date of Patent: Jan. 30, 2024

(54) WIRELESS SMART DIMMER FOR TRACK LIGHTING

(71) Applicant: WESTPORT INTERNATIONAL CO., LTD., Taipei (TW)

(72) Inventors: Ting-Mao Lin, Taipei (TW); Dong-Jung Suen, Taipei (TW)

(73) Assignee: WESTPORT INTERNATIONAL CO., LTD., Taipei (TW)

( * ) Notice: Subject to any disclaimer, the term of this patent is extended or adjusted under 35 U.S.C. 154(b) by 0 days.

(21) Appl. No.: 18/078,997

(22) Filed: Dec. 11, 2022

(51) Int. Cl.
*H05B 47/19* (2020.01)

(52) U.S. Cl.
CPC .................................... *H05B 47/19* (2020.01)

(58) Field of Classification Search
CPC ........ H05B 45/10; H05B 45/20; H05B 47/11; H05B 47/12; H05B 47/18; H05B 47/19; H05B 45/30; H05B 47/125; H05B 47/13; H05B 47/14; H05B 45/12; H05B 45/22; H05B 45/31; H05B 45/315; H05B 45/3578; H05B 45/3725; H05B 45/18; H05B 45/325; H05B 45/36; H05B 45/375; H05B 45/38; H05B 45/385; H05B 45/395; H05B 45/56; H05B 45/60; H05B 47/10; H05B 47/16; H05B 47/24; H05B 47/25; H05B 47/26; F21Y 2115/10; F21Y 2105/00; F21Y 2113/00; F21Y 2113/13; F21Y 2115/15; F21K 9/00; F21K 9/275; F21K 9/278; F21V 14/003; F21V 14/02; F21V 14/06; F21V 17/02; F21V 21/005; F21V 21/025; F21V 21/04; F21V 21/096; F21V 21/112; F21V 21/14; F21V 21/15; F21V 21/16; F21V 21/22; F21V 21/29; F21V 21/30; F21V 21/35; F21V 21/38; F21V 23/002; F21V 23/003; F21V 23/0435; F21V 23/06; F21V 7/10; F21V 17/10; F21V 17/101; F21V 19/02; F21V 23/02; F21V 23/04; F21V 7/0016; F21V 33/0052; F21V 23/0464; F21V 21/08; F21V 23/0407; F21V 23/0471; F21V 23/0492; F21V 25/00; F21V 9/08; F21S 10/005; F21S 2/005; F21S 8/066;
(Continued)

(56) References Cited

U.S. PATENT DOCUMENTS

| | | | | |
|---|---|---|---|---|
| 11,739,922 B2 * | 8/2023 | Hoffman | H05B 45/20 362/249.11 |
| 2017/0244934 A1 * | 8/2017 | Chien | H04N 7/183 |

(Continued)

*Primary Examiner* — Monica C King

(57) ABSTRACT

A track light wireless smart control device includes a track light adaptor including a power live-in pin, a first power live-out pin and a neutral pin, a plug-in stem, a cover, an outer case, a phase-cut dimmer module and a wireless communication module. When mounted to the lighting track, the power live-in pin is connected to the power input loop in the rail, the power live-out pin is connected to the #1 live-out conductor in the rail, and the neutral pin is connected to the neutral conductor in the rail. The wireless communication module receives the command message sent by the remote control device. The phase-cut dimmer module regulates the current to the output conductor loop according to the wireless command message, so as to enable the phase-cut dimmable track lights connected to the #1 live-out conductor to power on, power off, dimming up or dimming down.

6 Claims, 4 Drawing Sheets

(58) Field of Classification Search
CPC . F21S 2/00; Y02B 20/40; Y02B 20/30; Y02B 90/20; A61N 2005/0652; A61N 2005/0653; A61N 2005/0663; A61N 5/0618
See application file for complete search history.

(56) References Cited

U.S. PATENT DOCUMENTS

| | | | | |
|---|---|---|---|---|
| 2018/0249054 | A1* | 8/2018 | Chien | F21V 23/0464 |
| 2019/0035569 | A1* | 1/2019 | Sadwick | H05B 45/20 |

* cited by examiner

WIRELESS SMART DIMMER FOR TRACK LIGHTING

BACKGROUND OF THE INVENTION

1. Field of the Invention

The present invention relates to dimmer technology and more particularly, to a wireless remote controlled smart dimmer for phase-cut track lights, used for simultaneously controlling a number of dimmable track lights installed on a single circuit by message sent from a remote control device.

2. Description of the Related Art

Track lighting is a lighting system where lamps or light fixtures are attached anywhere on a continuous metal track which contains electrical conductors. The copper conductors transmit electric power to track lamps mounted, via compatible adaptors, along the tracks pre-laid on the ceiling and wall to distribute the power lines. Multiple sets of track lights can be moved and installed on the track rails to provide flexible and changeable light illumination. At present, it has been widely used in various indoor environments. The current control is mostly realized by the physical dimmer switch connected to the track rail to execute power on, off, dimming up and down.

However, to control individual or multiple lights or lamps on the track system in a remote wireless manner, the existing practice is to add a wireless communication module in the dimmable track lights. Each and every module inside the lights or lamps receives wireless signal to act as per message instructions. This approach will increase the unit cost of track lighting and reduce the willingness of users.

SUMMARY OF THE INVENTION

The present invention provides a wireless smart dimmer device which is mounted on a lighting rail, to receive at least one command message sent from a remote controller or a handheld device to control multiple numbers phase-cut dimmable track lights connected on the same lighting track. This wireless smart dimmer comprises a track light adaptor, a plug-in stem, a cover, an outer case, a phase-cut dimmer module and a wireless communication module. The track light adaptor, same as most exiting track light adaptors, has a power live-in pin, a power live-out pin and a neutral pin. When the wireless smart dimmer is mounted to the lighting track, the power live-in pin is connected to the power live loop in the lighting track, the power live-out pin is connected to a #1 live-out conductor in the lighting track, and the neutral pin is connected to the neutral conductor inside the track rail. The track light adaptor has a plug-in stem seating above the cover. The cover is combined with the outer case with a cavity space between the cover and the outer case. The phase-cut dimmer module is rest in the cavity space, and the phase-cut dimmer module has more than 3 conductors extended to 3 pins on the adaptor. The wireless communication module is also installed in the cavity space together with phase-cut dimmer. After receiving the command signal from the remote controller or the handheld device, wireless module converts commends and sends dimming instruction to the phase-cut dimmer through the signal wires. The phase-cut dimmer module then follows instruction to adjusts the output current to the #1 live-out conductor-, so as to determine the power on, power off, dimming up or dimming down state of multiple sets of phase-cut dimmable track lights being connected to the #1 live-out conductor wire.

In an embodiment of the present invention, the track light adaptor and the matching lighting track are not limited to the dual-circuit lighting track but also complying to multiple circuits track system. When this wireless smart dimmer is installed in the multiple circuits lighting track, the live-out conductor can be adjusted to connect and to distribute output current to either one conductor in the multiple circuits lighting track system.

In one embodiment of the present invention for multiple circuits lighting track, the phase-cut dimmer module adjusts the output current of the #2 live-out wire or other specified conductor loop according to the command signal sent by the remote controller or the handheld device to determine the on, off, dimming up or dimming down state of single or multiple numbers of phase-cut dimmable track lights which being set to connect on the #2 live-out conductor or other specified conductor loop.

In one embodiment of the present invention, the wireless smart dimmer on the lighting track simultaneously controls the multiple numbers of phase-cut dimmable track lights set in the lighting track by receiving the command signal from the remote controller or the handheld device.

In one embodiment of the present invention, the wireless smart dimmer is suitable for phase-cut dimming lamps and lights with mains voltages of 100V, 110V, 120V, 220V, 240V, and 277V.

In one embodiment of the present invention, the #1 live-out conductor and the #2 live-out conductor are independent loops.

In one embodiment of the present invention, the communication protocol of the wireless communication module is at least one of Bluetooth, WIFI, Zigbee and Microwave Radio.

To sum up, the track light wireless smart control device disclosed in this creation can bring the following benefits:

1. It is suitable to common standard track rail systems for lighting and their matching connection accessories which are commonly used in North America, Europe and Japan.
2. It follows the existing track light installation excise without special works thus to immediately upgrade the remote control function.
3. It saves installation cost and track lighting unit costs.

The following is a detailed description of the specific embodiments, and it is easier to understand the purpose, technical content, characteristics and benefits of this creation.

DETAILED DESCRIPTION OF THE PREFERRED EMBODIMENT

In order to solve the problems of difficult remote control and sectional dimming control of the existing track lights, the inventor has improved the criticism of the existing products. The following details shows how this new invention "a wireless smart track light dimmer" meets the remote smart control functional demands.

Figure 1:
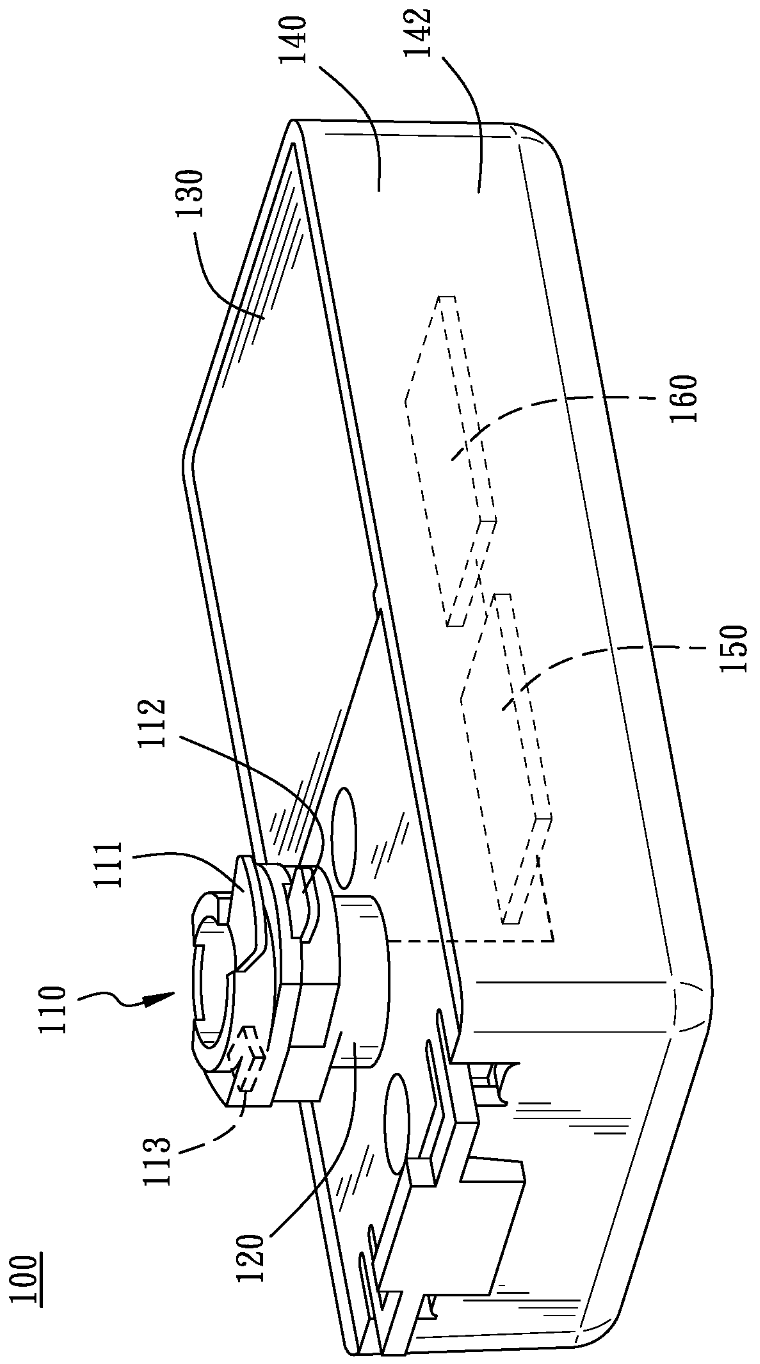
FIG. 1 is a schematic diagram of the wireless smart dimmer for track lighting in accordance with the present invention.
Figure 2:
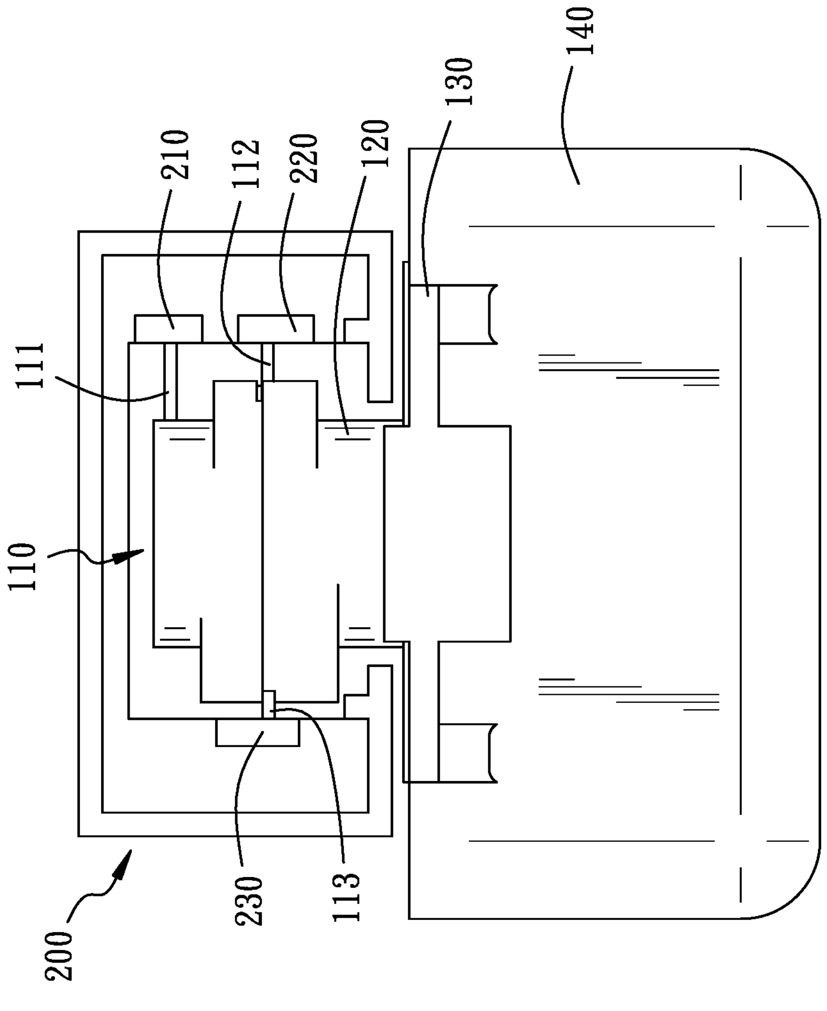
FIG. 2 is a section view of the three contact pins of the wireless smart dimmer mounted in lighting track rail in accordance with the present invention.
Figure 3:
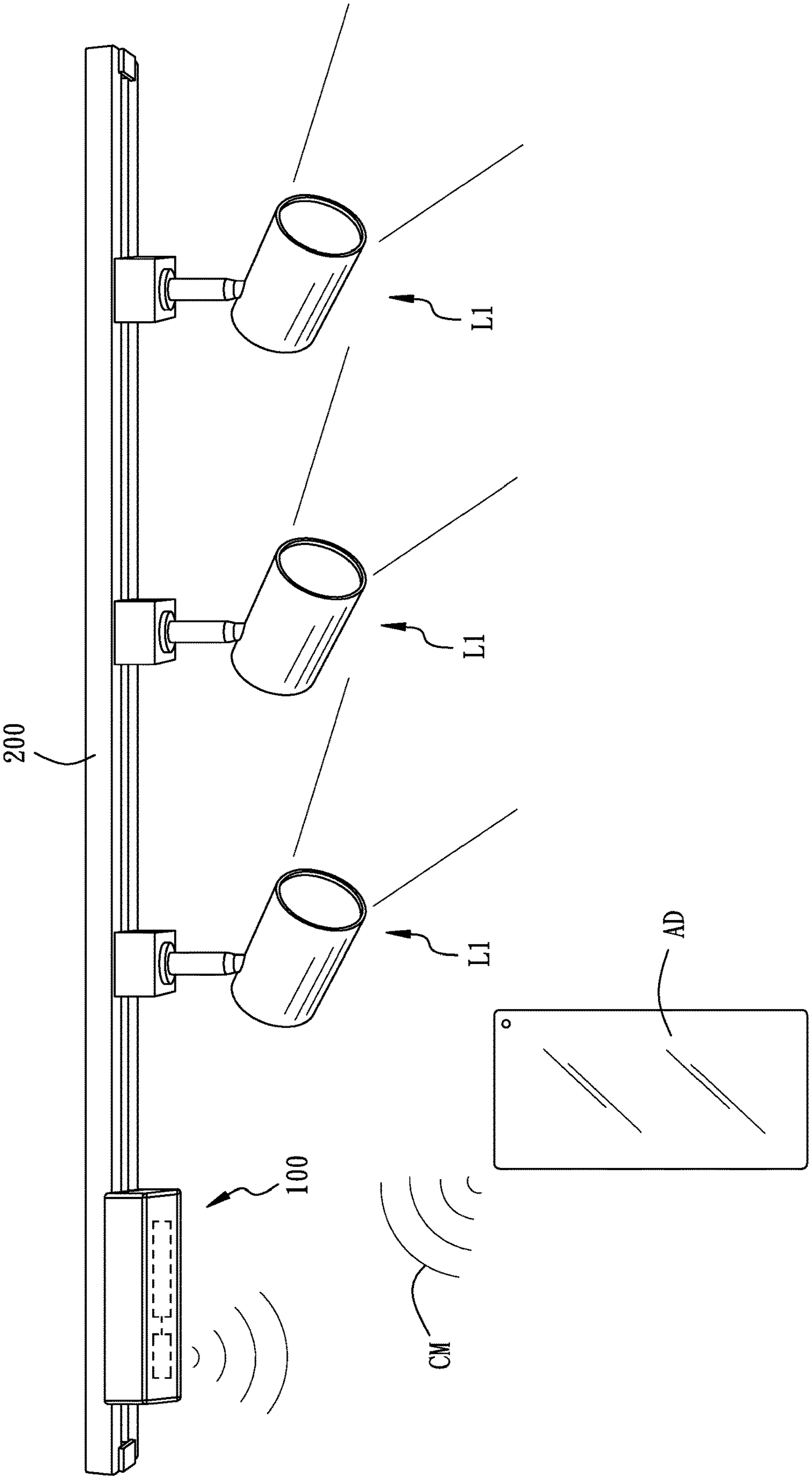
FIG. 3 is a schematic diagram of remote control lights working with controller or handheld device via the wireless smart dimmer for track lighting created by the present invention installed on the lighting track.

Please refer to FIGS. 1-3, where FIG. 1 is a schematic diagram of the wireless smart dimmer for track lighting in accordance with the present invention, FIG. 2 is a section view of the three contact pins of the wireless smart dimmer for track lighting mounted on the track rail in accordance with the present invention, and FIG. 3 is a schematic diagram of remote control lights working with controller or handheld device via the wireless smart dimmer for track lighting created by the present invention installed on the lighting track. As shown in the drawings, in this embodiment, the track light wireless smart control device 100 has a remote wireless control phase-cut dimming function, especially for receiving at least one command signal CM from a remote controller or a handheld device AD to simultaneously control multiple phase-cut dimmable track lights L1 disposed on a lighting track 200. The track light wireless smart control device 100 is suitable for phase-cut dimming lamps or lights with mains voltage of 100V, 110V, 120V, 220V, 240V, 277V. The track light wireless smart control device 100 installed on the lighting track 200 comprises a track light adaptor 110, a plug-in stem 120, a cover 130, an outer case 140, a phase-cut dimmer module 150 and a wireless communication module 160.

The communication protocol of the wireless communication module 160 is at least one of Bluetooth, WIFI, Zigbee and Microwave Radio, but is not limited to the above four wireless communication protocols.

The track light adaptor 110 has a power live-in pin 111, a power live-out pin 112 and a neutral pin 113. In this embodiment, the track light adaptor 110 is a three-contact joint. When the track light wireless smart control device 100 is to be installed on the lighting track 200, the power live-in pin 111 is connected to a power live-in conductor 210 in the lighting track 200 to receive electrical power, the power live-in conductor 210 is connected to the general mains power supply input end, the first power live-out pin 112 is connected to a live-out conductor 220 in the lighting track 200, which is an independent loop, and the neutral pin 113 is connected to a neutral conductor 230 in the lighting track 200.

The plug-in stem 120 is extruded on the top of the track light adaptor 110 and above the cover 130. The outer case 140 is arranged and connected below the covering body 130, wherein there is a cavity space 142 between the outer case 140 and the covering body 130. The phase-cut dimmer module 150 is installed in the cavity space 142, and the phase-cut dimmer module 150 has more than 3 wires connected to 3 pins on the track light adaptor 110. The wireless communication module 160 is added in the cavity space 142 and connected to the phase-cut dimmer module 150 via signal wires. The wireless communication module 160 is used for receiving the command signal CM from the remote controller or the handheld device AD. The phase-cut dimmer module 150 sends the output current of the #1 live-out conductor 220 according to the command signal CM instructing the on, off, dimming up or dimming down state of the phase-cut dimmable track lights L1 mounted together on the #1 live-out conductor 220 loop. That is to say, the power live-in pin 111 receives electrical power from the power live-in conductor 210, and then electrical power runs through the phase-cut dimmer module 150, which follows the command instruction from the wireless communication module 160, to provide the power output mode status. The phase cut dimmer output side is connected to the #1 live-out conductor 220 of the track rail through the power live-out pin 112. The phase-cut dimmable track light L1 connected to this independent #1 live-out conductor 220 will be switched on, off, dimming up or dimming down according to the instructions received by the wireless communication module 160, and other lamps not connected to the #1 live-out conductor 220 will not be affected.

It is worth noting that the track light wireless smart control device 100 of the present invention will be suitable for installation in most of the existing traditional track lighting systems, which can immediately enhance the wireless control lighting function of track lighting.

Figure 4:
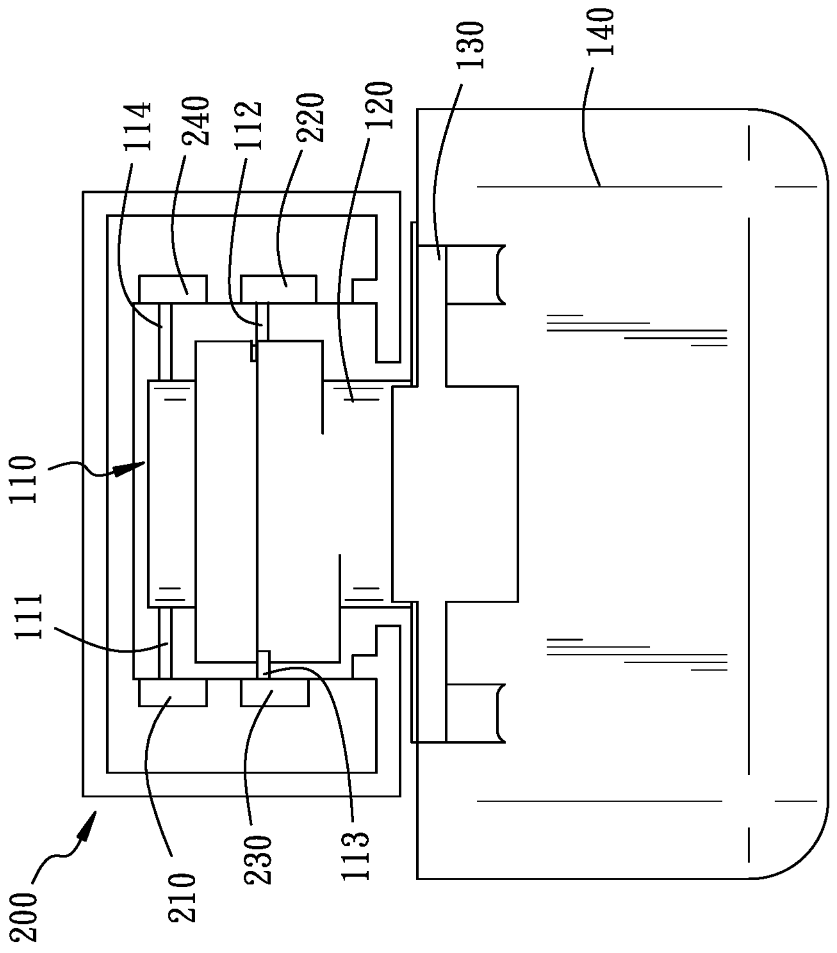
FIG. 4 is a section view of the four contacts adaptor of the wireless smart dimmer for track lighting in accordance with the present invention.

Please continue to refer to FIGS. 1-4, where FIG. 4 is a section view of the four contacts of the track light wireless smart control device of the present invention. In this embodiment, the track light adaptor 110 is a four-contact joint. The track light adaptor 110 and the matching lighting track 200 are not limited to a dual-circuit lighting track, but are applicable to the construction of a multi-circuit lighting track. When the track light wireless smart control device 100 is installed on the multi-circuit lighting track, either one of the conductor loops in the multi-circuit lighting track can be selected to be connected for controllable power in. In this embodiment, the track light adaptor 110 further comprises a second power live-out pin 114. When the track light wireless smart control device 100 is to be mounted on the multi-circuit lighting track 200, the power live-in pin 111 is connected to one power live-in conductor 210 in the lighting track 200 of the multi-circuit to obtain live power. It should be noted that, in another embodiment, the track light adaptor 110 further comprises a plurality of output contact conductors (ie, more than two), wherein when installed on the corresponding multi-circuit lighting tracks 200, the respective output contact conductors are respectively connected to the return conductors in the multi-circuit lighting tracks 200

The second power live-out pin 114 is connected to a #2 live-out wire 240 in the lighting track 200. The first power live-out pin 112 is connected to the #1 live-out conductor 220 in the lighting track 200. The #1 live-out wire 220 and the #2 live-out wire 240 are independent loops. The neutral pin 113 is installed in contact with a neutral wire 230 in the lighting track 200. In the present embodiment, the remote controller or the handheld device AD will send the command signal CM to the wireless communication module 160, and the wireless communication module 160 will transform the command signal CM to the phase-cut dimmer module 150 again.

Next, the phase-cut dimmer module 150 adjusts the current to the #2 live-out conductor 240 according to the command signal CM, so as to execute the on, off, dimming up or dimming down state of the phase-cut dimmable track lights (not shown) connected to #2 live-out conductor 240. That is to say, the track light wireless smart control device 100 simultaneously controls a plurality of second track lamps arranged in the lighting track 200 by receiving the command signal CM from the remote controller or the handheld device AD. It should be noted that the #1 live-out wire 220 and the #2 live-out wire 240 are independent loops, which are separately connected to at least one phase-cut dimmable track light (not limited to a single lamp) and at least one other phase-cut dimmable track light (not limited to a single lamp) that are in different groups. It is worth mentioning that, according to the above construction and operation mechanism, this track light wireless smart control device 100 of the present invention can be applied to the commonly used multi-circuit track rail systems for North American, European and Japanese lighting lamps and their adaptable connection accessories.

To sum up, the track light wireless smart control device disclosed in the present invention can bring the following benefits:

1. It is applicable to the commonly used multi-circuit track rail system for North American, European and Japanese lighting lamps and their matching connection accessories.
2. It follows existing track light installation practice to immediately upgrade the remote control function.
3. It realizes remote wireless dimming control of multiple groups of track lights or lamps on a track lighting rail system.

What the invention claimed is:

1. A track light wireless smart control device used for simultaneously controlling multiple groups of dimmable track lights arranged in a lighting track by receiving a command signal from a remote controller/handheld device, said track light wireless smart control device comprising:

a track light adaptor comprising a power live-in pin, a power live-out pin and a neutral pin, said power live-in pin being connected to a power live-in conductor in said lighting track, said first power live-out pin being connected to a #1 live-out conductor in said lighting track, said neutral pin being connected to one of multiple neutral conductors in said lighting track;

a cover;

a plug-in stem arranged above said cover;

an outer case connected below said cover and defining with said cover a cavity space therebetween;

a phase-cut dimmer module, including forward phase type and reverse phase type, arranged in said cavity space, said phase-cut dimming module comprising at least 3 conductors connected to said track light adaptor; and a wireless communication module set in said cavity space and connected with said phase-cut dimmer module, said wireless communication module being used to receive the command signal from said remote controller/handheld device;

wherein said phase-cut dimmer module regulate the current to said #1 live-out conductor according to said command signal to determine the on, off, dimming up or dimming down state of the phase-cut dimmable track lights connected to said #1 live-out wire.

2. The track light wireless smart control device as claimed in claim 1, wherein when said track light wireless smart control device is applied to the lighting track of multiple circuits, said track light adaptor further comprises a second power live-out pin, said second power live-out pin being connected to one #2 live-out conductor in said lighting track when said track light wireless smart control device is mounted to the lighting track of the corresponding multiple circuits.

3. The track light wireless smart control device as claimed in claim 2, wherein said phase-cut dimmer module adjusts the current of said #2 live-out conductor or a specified conductor loop according to the command signal sent by said remote controller/handheld device, so as to determine the on, off, dimming up or dimming down status of the phase-cut dimmable track lights positioned on said #2 live-out conductor or said specified conductor loop.

4. The track light wireless smart control device as claimed in claim 2, which is suitable for phase-cut dimming lamps with supply voltage of 100V, 110V, 120V, 220V, 240V, 277V.

5. The track light wireless smart control device as claimed in claim 2, wherein said #1 live-out conductor and said #2 live-out conductor are independent loops.

6. The track light wireless smart control device as claimed in claim 1, wherein the communication protocol of said wireless communication module is at least one of Bluetooth, WIFI, Zigbee and Microwave Radio.

* * * * *